United States Patent [19]

Gunschmann et al.

[11] Patent Number: 5,623,385
[45] Date of Patent: Apr. 22, 1997

[54] ROTARY SCANNING DEVICE

[75] Inventors: Peter Gunschmann, Darmstadt; Peter Lameli, Lampertheim; Hartmut Willmann, Gross Zimmern; Werner Maack, Seeheim, all of Germany

[73] Assignee: U.S. Philips Corporation, New York, N.Y.

[21] Appl. No.: 709,614

[22] Filed: Sep. 9, 1996

Related U.S. Application Data

[63] Continuation of Ser. No. 371,662, Jan. 11, 1995, abandoned, which is a continuation of Ser. No. 68,808, May 27, 1993, abandoned.

[30] Foreign Application Priority Data

Jul. 2, 1992 [DE] Germany ............................ 42 21 729.6

[51] Int. Cl.$^6$ .............................. G11B 5/56; G11B 21/24
[52] U.S. Cl. ............................................................ 360/109
[58] Field of Search .................................... 360/107, 109, 360/108, 84, 130.22, 130.23, 130.24, 128, 75, 77.02, 77.12, 77.13

[56] References Cited

U.S. PATENT DOCUMENTS

| | | | |
|---|---|---|---|
| 3,029,318 | 4/1962 | Et al ........................................ | 360/109 |
| 3,286,041 | 11/1966 | Nishiwaki ................................ | 360/109 |
| 3,428,760 | 2/1969 | Hayashi et al. ...................... | 360/130.24 |
| 4,099,212 | 7/1978 | Dolby .................................. | 360/130.22 |
| 4,306,261 | 12/1981 | Bergmans et al. ...................... | 360/109 |
| 4,524,402 | 6/1985 | Ueda et al. ........................ | 360/130.24 |
| 4,725,910 | 2/1988 | Kaku et al. ........................ | 360/130.24 |

FOREIGN PATENT DOCUMENTS

| | | | |
|---|---|---|---|
| 2519700 | 11/1976 | Germany ............................... | 360/109 |
| 2522583 | 12/1976 | Germany ............................... | 360/109 |
| 58-182128 | 10/1983 | Japan ..................................... | 360/84 |
| 62-36719 | 2/1987 | Japan ..................................... | 360/104 |
| 1030849 | 4/1983 | U.S.S.R. ................................. | 360/109 |

*Primary Examiner*—Stuart S. Levy
*Assistant Examiner*—William J. Klimowicz
*Attorney, Agent, or Firm*—Brian J. Wieghaus

[57] ABSTRACT

A rotary scanning device having a stationary upper and lower drum (1,2) is proposed, in which a cylindrical insert (15) with a servo head (16) is arranged in a radial bore (14) in the lower drum (2). The cylindrical insert (15) is secured to the circumference of a ring (18) which is concentrically supported in the lower drum (2) and which has an axial groove (19) in its circumferential surface for the adjustment of the angular position of the ring (18).

7 Claims, 1 Drawing Sheet

5,623,385

ROTARY SCANNING DEVICE

This is a continuation of application Ser. No. 08/371,662, filed on Jan. 11, 1995, now abandoned which is a continuation of Ser. No. 08/068,808, filed May 27, 1993, now abandoned.

BACKGROUND OF THE INVENTION

The invention relates to a rotary scanning device having a stationary guide drum around which a magnetic tape is wrapped along a helical path, and a cylindrical insert mounted in a radial bore in the guide drum, which insert has one end face adapted to the surface of the guide drum and carriers a magnetic head for scanning a servo track in a slot in the end face.

When signals are recorded on a magnetic tape, which is wrapped around a rotary scanning device along a helical path, a plurality of track portions are recorded which are inclined relative to the direction of movement of the magnetic tape. Generally, a tracking signal is recorded in a longitudinal track of the magnetic tape, the so-called servo track, in order to ensure that in a reproduction mode the magnetic heads can follow the previously recorded tracks, the pulses of said tracking signal being in a fixed relationship to the transverse or inclined track portions on the magnetic tape. In a recording mode the tracking signal is recorded in the servo track by means of a separate stationary servo head and in a reproduction mode it is subsequently read from the servo track.

Magnetic tapes are subjected to several influences affecting the mechanical dimensions of the magnetic tape. Such influences are, for example, changes of the atmospheric humidity, temperature variations, and also mechanical loads. Therefore, it has proved to be effective to arrange the servo head at a location which, viewed in the tape transport direction, is spaced at a fixed distance from the location where the signals are recorded and reproduced. If this is not the case the recorded oblique tracks will not be scanned correctly by the magnetic reproducing heads, resulting in a degradation of the signal-to-noise ratio of the reproduction signal.

In order to avoid these problems the geometrical position of scanning of the recorded signals and that of the tracking signals are arranged as close as possible to one another in the longitudinal direction of the magnetic tape. This step enables the influence of errors caused by a length variation of the magnetic tape to be reduced.

DE 25 22 583 A1 discloses a device for securing a magnetic servo head in the stationary guide drum of a helical-scan magnetic-tape apparatus. The guide drum has a radial bore for receiving a cylindrical insert having one end face adapted to the cylindrical surface of the guide drum and carrying the magnetic servo head in a slot in the end face.

For the mechanical adjustment of the track position, during which the distance between the oblique tracks and the tracking pulses in the servo track is to be adjusted, it is customary that the rotary body which carries the magnetic heads for scanning the oblique tracks at its periphery is moved in its axial direction. This is effected via a drive shaft of the rotary body. However, tolerances of the bearing element fits then give rise to tilting of the drive shaft. This gives rise to track curvatures in the scanning direction, which complicate a compatible reproduction of the signals recorded in the oblique tracks.

SUMMARY OF THE INVENTION

Therefore, it is an object of the present invention to provide a rotary scanning device of the type defined in the opening paragraph, whose track position is adjustable in such a way that no track curvatures arise.

This object is achieved in that a ring is supported concentrically in the guide drum to whose circumference the cylindrical insert is secured, which insert extends through the radial bore with clearance. Adjustment of the angular position of the ring adjusts the angular position of the servo head in the bore and its relative position with respect to the magnetic heads on the head disc.

The rotary scanning device in accordance with the invention, has the advantage that an axial displacement of the drive shaft is not necessary owing to the adjustment of the servo head in the tape guidance direction, so that track curvature errors can no longer occur.

BRIEF DESCRIPTION OF THE DRAWINGS

An embodiment of the invention will now be described in more detail, by way of example, with reference to the drawing. In the drawing.

DESCRIPTION OF THE PREFERRED EMBODIMENTS

Figure 1:
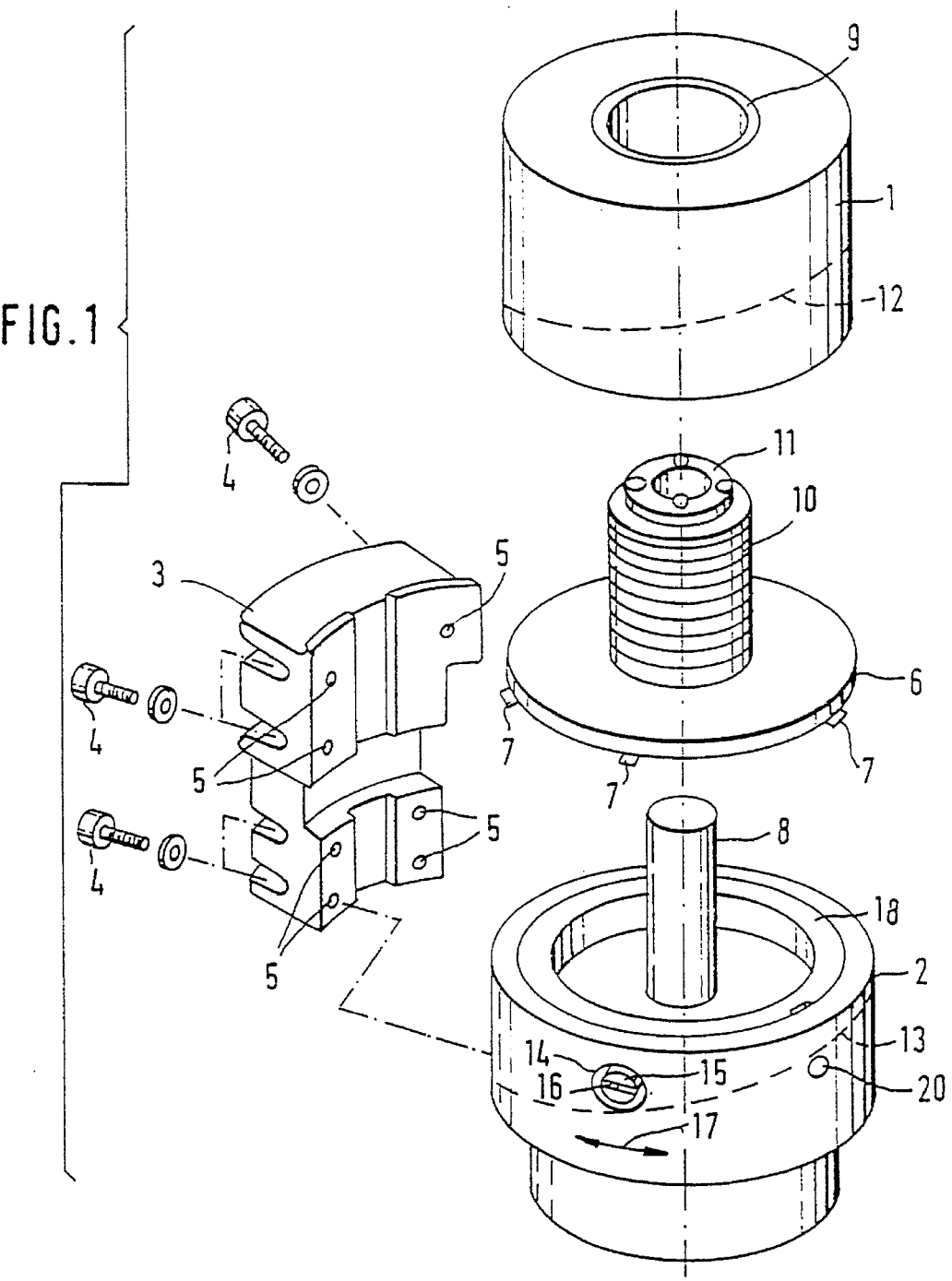
FIG. 1 is an exploded view of a rotary scanning device in accordance with the invention comprising a device for adjusting the track position of the magnetic servo head.

FIG. 1 shows an upper drum 1 and a lower drum 2 of a stationary tape-guide drum. The upper drum 1 and the lower drum 2 are coaxially aligned by a V-block-type drum guide 3. The two drums 1 and 2 are secured by means of screws 4 which traverse bores 5 in the drum guide 3 to draw the drums 1 and 2 into and fix them in the V-block of the drum guide 3.

A head disc 6, which carries magnetic heads 7 at its periphery, rotates in a gap between the upper drum 1 and the lower drum 2. The head disc 6 is rotationally locked to a shaft 8, which is driven by a motor accommodated in the lower drum 2.

The transfer of signals to and from the magnetic heads 7 is effected in a manner known per se by means of rotary transformers comprising a stator section 9 and a rotor section 10. The rotor section 10 is connected non-positively to a mandrel 11 of the head disc 6.

A magnetic tape is wrapped around the stationary tape-guide drums 1 and 2 along a helical path. Broken lines 12 and 13 indicate the path of the magnetic tape on the two drums 1 and 2, the lines 12 and 13 representing the tape edges of the magnetic tape. In the proximity of one these tape edges but inside the area of the stationary tapeguide drums 1 and 2 which is covered by the magnetic tape a cylindrical insert 15 is fitted into a radial bore 14, which insert has one end face adapted to the surface of the tape guide drum 2 and in a slot in its end face it carries a servo head 16 for scanning the longitudinal servo track on the magnetic tape. The diameter of the bore 14 is approximately 1 mm larger than the outer diameter of the cylindrical insert 15, so that the cylindrical insert can be moved 0.5 mm in each of the directions indicated by the arrows 17. At its end opposite the end face adapted to the surface of the lower drum 2 the cylindrical insert 15 is secured to the circumference of a ring 18 which is concentrically supported in the lower drum 2.

Figure 2:
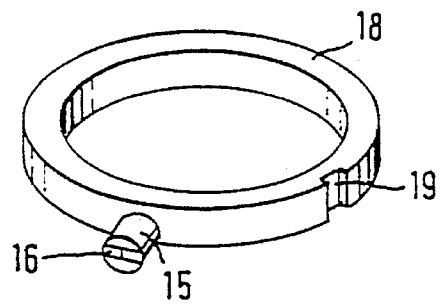
FIG. 2 is a perspective view of an adjustment ring carrying the magnetic servo head.

FIG. 2 is a perspective view of the ring 18 which is concentrically supported in the lower drum 2. In the Figures like parts bear the same reference numerals. In its circumferential surface the ring 18 has an axial groove 19. Opposite this groove 19 the lower drum 2 has a further radial bore 20 through which the angular position of the ring and, as a consequence, of the magnetic servo head 16 can be adjusted by means of a lever tool. A suitable lever tool is, for example, an eccentric wrench which is inserted into the radial bore 20 and is turned to change the angular position of the concentrically supported ring 18. The movement of the ring 18 in the directions indicated by the arrows 17 corresponds to a change in level of the head disc 6 and thus enables the track position to be adjusted.

In a first approach the adjustment plane of the magnetic servo head may extend perpendicularly to the axis of the head disc. However, this has the drawback that a rotation of the ring 18 may give rise to tracking errors when the servo track is scanned. This drawback can be avoided by a suitable construction if the ring 18 is adjusted in the direction of the tape edges 12, 13.

We claim:

1. A rotary scanning device, comprising:

a) a tape guide drum having an outer surface for receiving a magnetic tape along a helical path, said tape guide drum including an aperture wall defining an aperture at said outer surface, the aperture having (i) a geometric center and (ii) a diametral dimension extending as a geometric cord at said outer surface of said tape guide drum and generally transverse to radii of the tape guide drum within said aperture;

b) a servo track magnetic head arranged for scanning a servo track on the magnetic tape, said servo track magnetic head being arranged in said aperture at a distance from the helical path and having clearance with said aperture wall;

c) a head disc rotatable with respect to said tape guide drum about an axis of rotation, said head disc including scanning magnetic heads for scanning recorded tracks adjacent to the servo track on the magnetic tape; and d) mounting means for mounting said servo track magnetic head, without movement of said head disc along said axis of rotation, for translation of the servo track magnetic head within said aperture to (i) adjust the translational distance along the diametral dimension of the servo track magnetic head relative to the center of the aperture, (ii) the angular position of said servo track magnetic head about said axis of rotation within said aperture, (iii) the relative angular positions of the servo head and the scanning magnetic heads about said axis of rotation and (iv) the distance between the servo head and the helical path.

2. A rotary scanning device according to claim 1, wherein said mounting means comprises a ring mounted within said tape guide drum to which said servo track magnetic head is mounted, said ring being mounted so that its angular position about said axis of rotation is adjustable with respect to said tape guide drum to change the angular position of said servo track head about said axis of rotation and within said aperture in said outer surface of said tape guide drum.

3. A rotary scanning device according to claim 2, wherein said ring has an axial groove and opposite the groove said tape guide drum has a further aperture through which the groove is accessible for adjusting the angular position of the ring.

4. A rotary scanning device, comprising:

a) a tape guide drum having an outer surface for receiving a magnetic tape along a helical path extending about a longitudinal axis of the outer surface of the tape guide drum, said tape guide drum including a bore terminating at said outer surface, the bore having (i) a geometric center and (ii) a diametral dimension measured as a geometric cord at the outer surface and generally transverse to radii of said drum extending in said bore;

b) a servo track magnetic head arranged for scanning a servo track on the magnetic tape, said servo track magnetic head being arranged with clearance in said bore; and c) a part holding said servo track magnetic head, said part being moveable with respect to said tape guide drum for adjusting (i) the translational distance along the diametral dimension of the servo track magnetic head relative to the center of the bore and (ii) the angular position of said servo track magnetic head about said longitudinal axis and relative to said helical path.

5. A rotary scanning device according to claim 4, wherein said part holding said servo track magnetic head is a ring rotatably arranged within said tape guide drum.

6. A rotary scanning device, comprising:

a) first and second tape guide drums having a longitudinal axis;

b) a drum guide aligning said tape guide drums and securing said first and second tape guide drums with an axial space therebetween, said tape guide drums having an outer surface for receiving a magnetic tape along a helical path, said first tape guide drum including a radially extending bore terminating at said outer surface;

c) a head disc rotatable with respect to said tape guide drums about the longitudinal axis in the axial space between said tape guide drums, said head disc including magnetic heads;

d) a motor within said first tape guide drum for rotatably driving said head disc;

e) an internal ring within said first tape guide drum concentric with said longitudinal axis, said ring being mounted so that its angular position about the longitudinal axis is adjustable with respect to said first tape guide drum;

f) an insert arranged with clearance in said radially extending said insert having one end secured to said internal ring and an opposing end adjacent said outer surface of said tape guide drum; and g) a servo track magnetic head arranged on said opposing end of said insert substantially flush with said outer surface of said tape guide drum, whereby adjustment of the angular position of said ring adjusts the relative positions of said servo track magnetic head with respect to said magnetic heads on said head disc.

7. A rotary scanning device according to claim 6, wherein said ring has an axial groove and opposite the groove said first tape guide drum has a further aperture through which the groove is accessible for adjusting the angular position of said ring.

* * * * *